E. P. MEYER.
PIPE HANGER.
APPLICATION FILED NOV. 5, 1917. RENEWED MAY 7, 1919.
1,318,503. Patented Oct. 14, 1919.
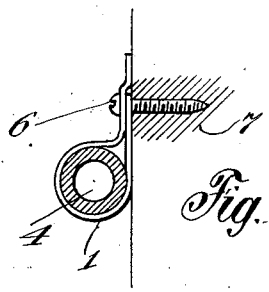
Fig. 1
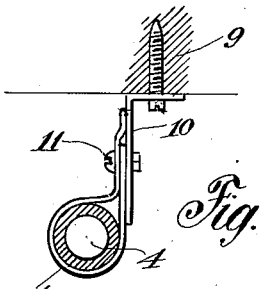
Fig. 2
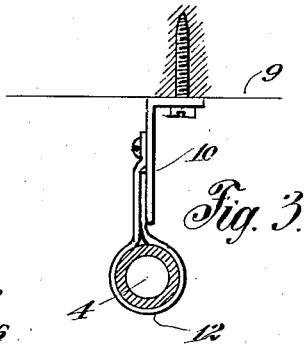
Fig. 3
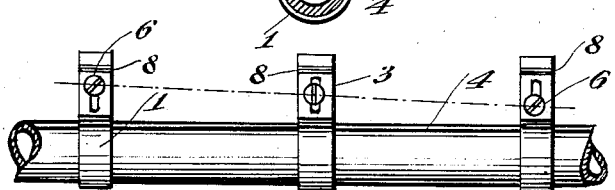
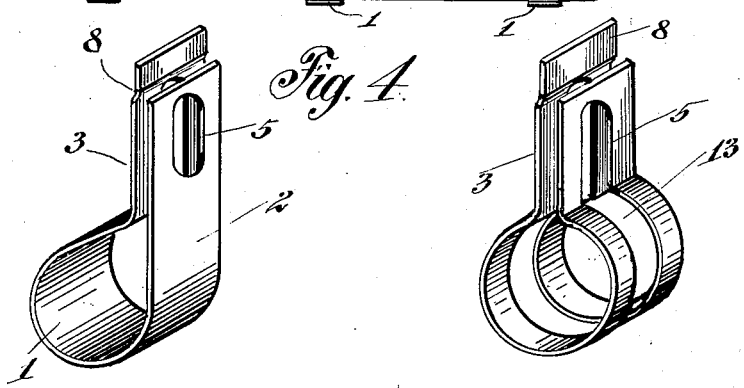
Fig. 5  Fig. 6
Witness
Charles Balz
Karl H. Butler
Inventor
Ernest P. Meyer
By
Attorneys

UNITED STATES PATENT OFFICE.

ERNEST P. MEYER, OF DETROIT, MICHIGAN.

PIPE-HANGER.

1,318,503. Specification of Letters Patent. Patented Oct. 14, 1919.

Application filed November 5, 1917, Serial No. 200,278. Renewed May 7, 1919. Serial No. 295,455.

*To all whom it may concern:*

Be it known that I, ERNEST P. MEYER, a citizen of the United States of America, residing at Detroit, in the county of Wayne and State of Michigan, have invented certain new and useful Improvements in Pipe-Hangers, of which the following is a specification, reference being had therein to the accompanying drawings.

This invention relates to a pipe hanger, and the primary object of my invention is to provide simple, durable and inexpensive hangers that may be advantageously used for holding a pipe or other member relatively to a wall, ceiling or other support, and provision is made, in a manner as hereinafter set forth, so that pipes or members may be properly supported irrespective of the attaching means of the hangers. It is in this connection that the hangers may be advantageously used for supporting pipes or other structures relatively to concrete walls or such supports where indurate objects are apt to be encountered by the supporting or fastening means of the hangers. It is not always possible to place the supporting or fastening means of pipe hangers in perfect alinement; whence to compensate for this inequality the hangers have been constructed so that the same may be adjusted relatively to the supporting or fastening means, and in this manner maintain the pipe or other member in a desired position.

Another object of my invention is to provide pipe hangers that may be easily and quickly stamped from sheet metal and bent to proper form so that the hangers will afford a substantial suspension means for pipes or members either directly below the supporting or fastening means of the hangers, or to one side thereof, and in either instance, the hangers are of sufficient strength to support the pipes or members so long as the supporting or fastening means of the hangers remain intact.

The above and other objects are attained by a mechanical construction that will be hereinafter specifically described and then claimed, and reference will now be had to the drawing, wherein—

Figure 1 is an end view of the preferred form of hanger, showing a pipe supported relatively to a wall;

Fig. 2 is a similar view showing a pipe hanger supported from a ceiling or overhead support, with the pipe positioned at one side of the hanger;

Fig. 3 is a similar view showing a pipe directly beneath the hanger;

Fig. 4 is a side elevation of a plurality of hangers, showing how there may be a variable relation between the supporting and fastening means of the hangers, and yet maintain the pipe or member carried thereby in a horizontal plane;

Fig. 5 is a perspective view of a pipe hanger, and

Fig. 6 is a similar view illustrating a modification of my invention.

A pipe hanger in accordance with my invention comprises a strap or strip of pliable sheet metal that is bent to provide a substantially cylindrical pipe supporting loop or portion 1, and as shown in Figs. 2 and 5, that end of the strap designated 2 may be tangent to the looped portion 1 of the hanger, and the other end of the strap designated 3 is carried into proximity to the tangentially disposed end 2 and placed in parallel relation therewith, so that when the looped portion 1 is placed about a pipe 4 or other member, the ends 2 and 3 may be brought into contacting relation.

The ends 2 and 3 of the hanger are provided with longitudinal slots 5 adapted to register so that a screw, nail or other supporting or fastening means 6 may be employed for maintaining the ends 2 and 3 in contact and positioned relatively to a wall 7 to support the pipe or member 4 in proximity thereto.

It is preferable to make the end 3 of the pipe hanger of greater length than the tangentially disposed end 2, and to inset the end 3, as at 8, so that this end of the hanger may engage the upper edge of the end 2 of the pipe hanger, should occasion require.

With the screw 6 extending through the slots 5 of the pipe hanger, it will be possible to adjust the pipe hanger bodily relatively to a screw, but it is possible for the end 3 of the pipe hanger to sag so that the inset portion 8 thereof will rest on the extreme upper edge of the end 2, and in this manner the two ends of the pipe hanger retained together on the screw 6.

The adjustment of the ends 2 and 3 of pipe hangers relatively to the supporting or fastening means has been nicely brought out in Fig. 4, where it will be observed that the screws are out of alinement with the longitudinal axis of the pipe or member 4. It is therefore possible to place the screws in places most convenient in a wall and yet have the looped portion of all of the hangers properly alined for supporting the pipe or member 4 in a horizontal position. This is of great advantage where the screws or fastening means encounter indurate objects in a cement wall or other support, necessitating placing the screws out of alinement or in such places where the screws may be properly anchored for holding the supports. It is by virtue of the oblong slots in the ends 2 and 3 of the hangers, that said hangers may be maintained in alinement.

In Fig. 2 of the drawing, a ceiling 9 is provided with a depending angle bracket or hanger 10, and a pipe hanger is shown attached to said hanger or bracket by a stove bolt and nut 11. In this instance, the pipe or member 4 is set to one side of the bracket 10, but in Fig. 3 there is shown a hanger 12 that has been bent to support the pipe or member 4 directly beneath the bracket 10.

To save material, reduce the weight of a pipe hanger, and increase the pliability thereof, it is possible to slot longitudinally a strap or strip of metal from one end thereof to the opposite end, as indicated at 13 in Fig. 6, this slot having its ends terminating in the ends 2 and 3 of the hanger so as to accommodate a supporting or fastening means. In the modified form of construction, the hanger comprises practically two bands in spaced relation, in contradistinction to the single looped portion 1 of the preferred form of construction, but in both instances, the hanger possesses sufficient strength in itself to support a pipe or member so long as the supporting or fastening means of the hanger remain intact relatively to a wall, ceiling or support.

The hangers may be made of various sizes, of various kinds of material and finished to harmonize with their supports or the pipes or members carried thereby.

While in the drawings there are illustrated the preferred embodiments of my invention, it is to be understood that the structural elements are susceptible to such variations and modifications as fall within the scope of the appended claim.

What I claim is:—

The combination of a depending angle bracket, a stove bolt and nut adjacent the lower end thereof, and a pipe hanger made of a single piece of material bent to provide a looped portion with one end of the material tangentially disposed and longitudinally slotted to bear against said bracket and receive said stove bolt, and the opposite end of the piece of material slotted and inset and carried into proximity to the tangentially disposed end thereof to receive said stove bolt and to be brought into engagement with the tangentially disposed end of said piece of material by tightening the bolt and nut, the said inset end of said piece of material overlying the opposite end thereof to engage said bracket and limit the downward movement of the inset of said piece of material relative to the opposite end thereof.

In testimony whereof I affix my signature in the presence of two witnesses.

ERNEST P. MEYER.

Witnesses:
ANNA M. DORR,
G. E. MCGRANN.